(12) United States Patent
     Chen

(10) Patent No.:  US 10,423,255 B2
(45) Date of Patent:  Sep. 24, 2019

(54) TOUCH CONTROL DISPLAY PANEL

(71) Applicant: Wuhan China Star Optoelectronics Technology Co., Ltd., Hubei (CN)

(72) Inventor: Chung-Chun Chen, Guangdong (CN)

(73) Assignee: Wuhan China Star Optoelectronics Technology Co., Ltd., Wuhan, Hubei (CN)

( * ) Notice: Subject to any disclaimer, the term of this patent is extended or adjusted under 35 U.S.C. 154(b) by 14 days.

(21) Appl. No.: 15/553,452

(22) PCT Filed: Jun. 28, 2017

(86) PCT No.: PCT/CN2017/090496
§ 371 (c)(1),
(2) Date: Aug. 24, 2017

(87) PCT Pub. No.: WO2018/209766
PCT Pub. Date: Nov. 22, 2018

(65) Prior Publication Data
US 2018/0335878 A1    Nov. 22, 2018

(51) Int. Cl.
*G06F 3/041*    (2006.01)
(52) U.S. Cl.
CPC .......... *G06F 3/0412* (2013.01); *G06F 3/0416* (2013.01); *G06F 2203/04103* (2013.01)
(58) Field of Classification Search
CPC .................. G06F 3/0412; G06F 3/0416; G06F 2203/04103
See application file for complete search history.

(56) References Cited

U.S. PATENT DOCUMENTS

| | | | |
|---|---|---|---|
| 9,274,636 B2 | 3/2016 | Xu | |
| 2016/0026291 A1* | 1/2016 | Zhao | G06F 3/044 345/174 |
| 2016/0342056 A1* | 11/2016 | Long | G02F 1/133345 |
| 2016/0378254 A1 | 12/2016 | Wang et al. | |
| 2017/0147123 A1 | 5/2017 | Wang et al. | |
| 2017/0192573 A1* | 7/2017 | Kim | G06F 3/0412 |

FOREIGN PATENT DOCUMENTS

| CN | 106526939 A | 4/2015 |
|---|---|---|
| CN | 105652498 A | 6/2016 |

* cited by examiner

*Primary Examiner* — Nelson M Rosario
(74) *Attorney, Agent, or Firm* — Andrew C. Cheng

(57) ABSTRACT

A touch control display panel includes: pixel units arranged in an array; data lines, any one of which being electrically connected to one column of pixel units; touch wires, arranged in a same layer as the data lines, a distance from the data line of an odd column of pixel units to a touch wire being equal to a distance from the data line of an even column of pixel units to another adjacent touch wire; scan lines, having a quantity of rows same as that of the pixel units; pixel electrodes and common electrodes, the common electrodes being also used as touch electrodes, the pixel electrodes being electrically connected to the pixel units, the touch electrodes being electrically connected to the touch wires. One touch electrode corresponds to multiple pixel electrodes. Therefore, manufacturing process is simplified, production efficiency is improved and thickness of touch control display panel is reduced.

20 Claims, 3 Drawing Sheets

TOUCH CONTROL DISPLAY PANEL

TECHNICAL FIELD

The invention relates to the field of liquid crystal technology, and particularly to a touch control display panel.

DESCRIPTION OF RELATED ART

With the development of science and technology, mobile phones, personal digital assistants, notebook computers and other digital tools have been widely used, and display screens are indispensable man-machine interfaces in these tools. In order to achieve the purposes of being m ore convenient, lighter and more humanization, many information products have adopted touch panels instead of traditional keyboards or mouse as their input devices.

The touch panels can be classified into many different types such as resistive type, capacitive type, optical type, acoustic wave type and electromagnetic type according to their touch sensing principles. Since capacitive type touch panels have advantages of fast response speed, high sensitivity, good reliability and high durability, and thus have been widely used. Based on different structures, the capacitive type touch panels include many types such as the type of a transparent electrode layer being formed directly on a protective glass (also refers to as One Glass Solution, shorted as OGS), the type of transparent electrode layers being respectively formed on two films between a protective glass and a display panel (also refers to as Glass/Film/Film, shorted as GFF), the type of a touch sensing layer being disposed between a polarizer of a display panel and a color filter substrate (also refers to as On-Cell) and the type of a touch sensing layer being embedded into a pixel structure of a display panel (also refers to as In-Cell), and so on.

In order to meet the current trend of lightweight and slim products, the In-Cell type touch panel can be integrated with an array substrate, which effectively reduces thickness of an entire touch control display device and simplifies manufacturing process and thus has been widely used. However, during a manufacturing process of integrating a touch control module into a display device, resulting from the design of sensor and fan-out of wires, an additional material is needed to realize the process, so that the cost of the display device equipped with the In-Cell touch is higher than the cost of a general display device, and the problem of poor production efficiency also would be caused by longer manufacturing time.

SUMMARY

A technical problem mainly to be solved by the invention is to provide a touch control display panel, which can simplify manufacturing process, improve production efficiency and reduce thickness of the touch control display panel.

In order to solve the above technical problem, a technical solution proposed by the invention is to provide a touch control display panel including: a plurality of pixel units arranged in an array; a plurality of data lines, wherein any one of the data lines is electrically connected with one column of pixel units; a plurality of touch wires, arranged in a same layer with the data lines, wherein the data line of an odd column of pixel units and the data line of an adjacent even column of pixel units respectively are located two sides of a corresponding touch wire; and between two adjacent touch wires, a distance between the data line of an odd column of pixel units and the data of an even column of pixel units is smaller than a distance from the data line of the odd/even column of pixel units and one of the two adjacent touch wires, and a distance from the data line of the odd column of pixel units to an adjacent one of the two adjacent touch wires is equal to a distance from the data line of the even column of pixel units to the other one of the two adjacent touch wires; a plurality of scan lines, wherein the scan lines has a quantity of rows same as a quantity of rows of the pixel units; pixel electrodes and common electrodes, wherein the common electrodes are also used as touch electrodes, the pixel electrodes are electrically connected with the pixel units, the touch electrodes are electrically connected with the touch wires, one touch electrode is corresponding to multiple pixel electrodes.

In order to solve the above technical problem, another technical solution provided by the invention is to provide a touch control display panel, including: a plurality of pixel units arranged in an array; a plurality of data lines, wherein any one of the data lines is electrically connected with one column of pixel units; a plurality of the touch wires, arranged in a same layer with the data lines, wherein the data line of an odd column of pixel units and the data line of an adjacent even column of pixel units respectively are located at two sides of one touch wire; between two adjacent touch wires, a distance between the data line of an odd column of pixel units and the data line of an even column of pixel units is smaller than a distance from the data line of the odd/even column of pixel units to an adjacent one of the two adjacent touch wires; a plurality of scan lines, wherein the scan lines have a quantity of rows same as a quantity of rows of the pixel units.

In order to solve the above technical problem, still another technical solution provided by the invention is to provide a display device including: a touch control display panel, a color filter substrate, and a liquid crystal layer disposed between the touch control display panel and the color filter substrate, wherein the color filter substrate comprises an opaque region, the touch control display panel comprises a plurality of pixel units arranged in an array, a plurality of data lines, a plurality of touch wires and a plurality of scan lines; any one of the data lines is electrically connected to one column of pixel units; the touch wires and the data lines are arranged in a same layer, the data lines of an odd column of pixel units and the data line of an adjacent even column of pixel units respectively are located at two sides of one touch wire; between two adjacent touch wires, a distance between the data line of an odd column of pixel units and the data line of an even column of pixel units is less than a distance from the data line of the odd/even column of pixel units to one of the two adjacent touch wires; a quantity of rows of the scan line is the same as a quantity of rows of the pixel units.

Efficacy can be achieved by the invention is that: different from the prior art, the touch control display according to the invention includes a plurality of pixel units arranged in an array, a plurality of data lines, a plurality of touch wires and a plurality of scan lines; any one of the plurality of data lines is electrically connected to one column of pixel units, the plurality of touch wires and the data lines are arranged in a same layer, the data line of an odd column of pixel units and the data line of an adjacent even column of pixel units respectively are located at two sides of one touch wire; between two adjacent touch wires, a distance between the data line of an odd column of pixel units and the data of an even column of pixel units is smaller than a distance from the data line of the odd/even column of pixel units to an adjacent one of the two adjacent touch wires; the plurality of scan lines have a quantity of rows same as a quantity of rows of the pixel units. Consequently, manufacturing process is simplified and production efficiency is improved.

DETAILED DESCRIPTION OF EMBODIMENTS

In the following, the invention will be described in detail in conjunction with the drawings and embodiments.

Figure 1:
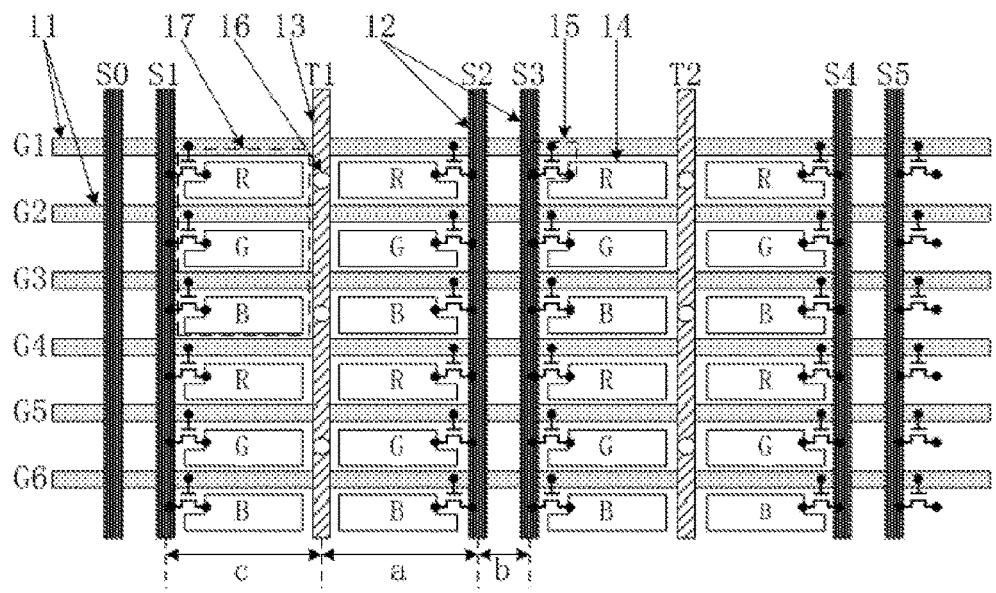
FIG. 1 is a schematic structural view of an embodiment of a touch control display panel according to the invention.

Referring to FIG. 1, FIG. 1 is a schematic structural view of an embodiment of a touch control display panel according to the invention. As shown in FIG. 1, the touch control display panel of the embodiment includes: scan lines 11, data lines 12, touch wires 13, pixel units 14, thin film transistors (TFTs) 15, contact holes 16 and pixel unit groups 17.

Each data line 12 is electrically connected with one column of pixel units 14 by the TFTs 15, the scan lines have a number/quantity of rows same as the number/quantity of rows of the pixel units 14 and are also electrically connected with the pixel units 14 by the TFTs 15.

The touch wires 13 and the data lines are disposed in the same layer, and the data line 12 corresponding to each odd column of pixel units 14 and the data line 14 corresponding to the adjacent even column of pixel units 14 respectively are located at two sides of one touch wire 12. Specifically, as shown in FIG. 1, the data lines 12 corresponding to the odd columns of pixel units 14 include the data lines S1, S3 and S5, the data lines 12 corresponding to the even columns of pixel units 14 include the data lines S0, S2 and S4. That is, the touch wire T1 is disposed between the data lines S1 and S2, and the touch wire T2 is disposed between the data lines S3 and S4.

Between two adjacent touch wires 13, a distance between the data line 12 of an odd column of pixel units 14 and the data line 12 of an even column of pixel units 14 is smaller than a distance from the data line 12 of the odd/even column of pixels units 14 to an adjacent one of the two adjacent touch wire 13. Specifically, as shown in FIG. 1, the data lines between the touch wires T1 and T2 are the data lines S2 and S3, the distance a from the touch wire T1 to the data line S2 is greater than the distance b between the data lines S2 and S3, i.e., a>b.

Optionally, the data line 12 of an odd column of pixel units 14 and the data line 12 of an adjacent even column of pixel units 14 respectively are arranged at two sides of one corresponding touch wire 13, and a distance from the data line 12 of the odd column of pixel units 14 to the touch wire 13 is equal to a distance from the data line 12 of the even column of pixel units 14 to the touch wire 13. Specifically, as shown in FIG. 1, the two sides of the touch wire T1 are arranged with the data lines S1 and S2 respectively, and the distance c from the data line S1 to the touch wire T1 is equal to the distance a from the data line S2 to the touch lead T1, that is c=a.

Optionally, the data line 12 of an odd column of pixel units 14 and the data line 12 of an adjacent even column of pixel units 14 respectively are arranged at two sides of one corresponding touch wire 13, and a distance from the data line 12 of the odd column of pixel units 14 to the touch wire 13 is greater than a distance from the data line 12 of the even column of pixel units 14 to the touch wire 13. Specifically, as shown in FIG. 1, the two sides of the touch wire T1 are arranged with the data lines S1 and S2 respectively, and the distance c from the data line S1 to the touch wire T1 is greater than the distance a from the data line S2 to the touch wire T1, i.e., c>a. At this time, a transverse width of each pixel unit between the data line S1 and the touch wire T1 is greater than a transverse width of each pixel unit between the data line S2 and the touch wire T1. In addition, the magnitudes of a, b and c can be adjusted according to actual requirements and are not limited herein.

The pixel units 14 are transversely arranged.

Optionally, colors of three pixel units 14 successively arranged in a same column are different from each other, and the pixel units 14 arranged in a same row have a same color. The colors of three pixel units 14 successively arranged in the same column are red (R), blue (B) and green (G). As shown in FIG. 1, the colors of the pixel units 14 of one pixel unit group 17 are red, green and blue. Alternatively, the colors of the pixel units 14 arranged in a same row may be different, and the colors of the pixel units 14 of one pixel unit group 17 may be white, red, green, blue, or may be yellow, red, green, blue, and so on.

Figure 2:
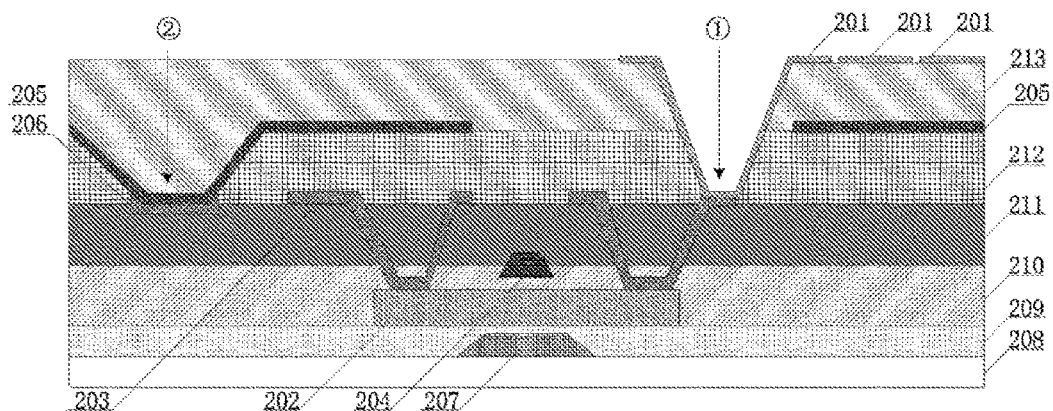
FIG. 2 is a schematic cross-sectional view of the embodiment of the touch control display panel according to the invention.

In addition, the touch control display panel in the embodiment further includes pixel electrodes and common electrodes, and the common electrode can be also used as touch electrodes. As shown in FIG. 2, FIG. 2 is a schematic cross-sectional view of the touch control display panel according to the invention, the touch control display panel in FIG. 2 includes a pixel electrode 201, a TFT 202, a data line 203, a scan line 204, a common electrode/touch electrode 205, a touch wire 206, a light blocking layer 207, a glass substrate 208, a first buffer layer 209, an insulating layer 210, a first protective layer 211, a second buffer layer 212, and a second protective layer 213. The glass substrate 208, the first buffer layer 209, and the insulating layer 210 are stacked with each other in that order. The light blocking layer 207 is located between the glass substrate 208 and the first buffer layer 209. The TFT 202 is located between the first buffer layer 209 and the insulting layer 210 so that the blocker layer 207 is located between the glass substrate 208 and the TFT 202.

The pixel electrode 201 is electrically connected to the pixel unit 14 in FIG. 1 (not shown in FIG. 2), the common electrode/touch electrode 205 is electrically connected to the touch wire 206; optionally, one common electrode/touch electrode 205 may be corresponding to one pixel electrode 201, or corresponding to multiple (i.e., more than one) pixel electrodes 201 instead. As shown in FIGS. 1-2, the touch wires 13, 206 are electrically connected to the common electrode/touch electrode 205 by a plurality of contact holes 16 arranged to form a 2-D array. The contact holes 16 arranged in $n^{th}$ row and the pixel units 14 arranged in $(2n-1)^{th}$ row are arranged in a same row, n is a natural number. Each contact hole 16 is located between adjacent two pixel units 14.

The groove ① in FIG. 2 corresponds to the contact pin of the TFT 15 in FIG. 1 connected with the pixel unit, the groove ② corresponds to the contact hole 16 in FIG. 1.

In one of specific application scenarios, when the touch control display panel is in a display stage, the touch wires 206 apply a common voltage signal to respective common electrodes 205, meanwhile a driving circuit supplies scan signals to respective scan lines 204 to sequentially scan rows of pixel units by the scan lines 204 and further supplies signals to the data lines 203 to transmit data signals to the pixel units by the data line 203, and thereby drives the touch control display panel to display an image; when the touch control display panel is in a touch control stage, supplying touch data signals to respective touch electrodes 205 by the touch wires 206, and at the same time disabling the electrical connections of the scan lines 204 and the data lines 203 with the pixel units, so as to sense/detect a touched position(s) of the touch control display panel.

The touch control display panel in the embodiment includes a plurality of pixel units arranged in an array, a plurality of data lines, a plurality of touch wires and a plurality of scan lines; any one of the plurality of data lines is electrically connected to one column of pixel units, the plurality of touch wires and the data lines are disposed in the same layer, the data line of an odd column of pixel units and the data lines of an adjacent even column of pixel units respectively are located at two sides of one touch wire; between two adjacent touch wires, the distance between the data line of an odd column of pixel units and the data line of an even column of pixel units is smaller than the distance from the data line of the odd/even column of pixel units to the adjacent touch wire, the number of rows of the plurality of scan lines is the same as the number of rows of the pixel units; as a result, manufacturing process is simplified, production efficiency is improved and thickness of the touch control display panel is reduced.

Figure 3:
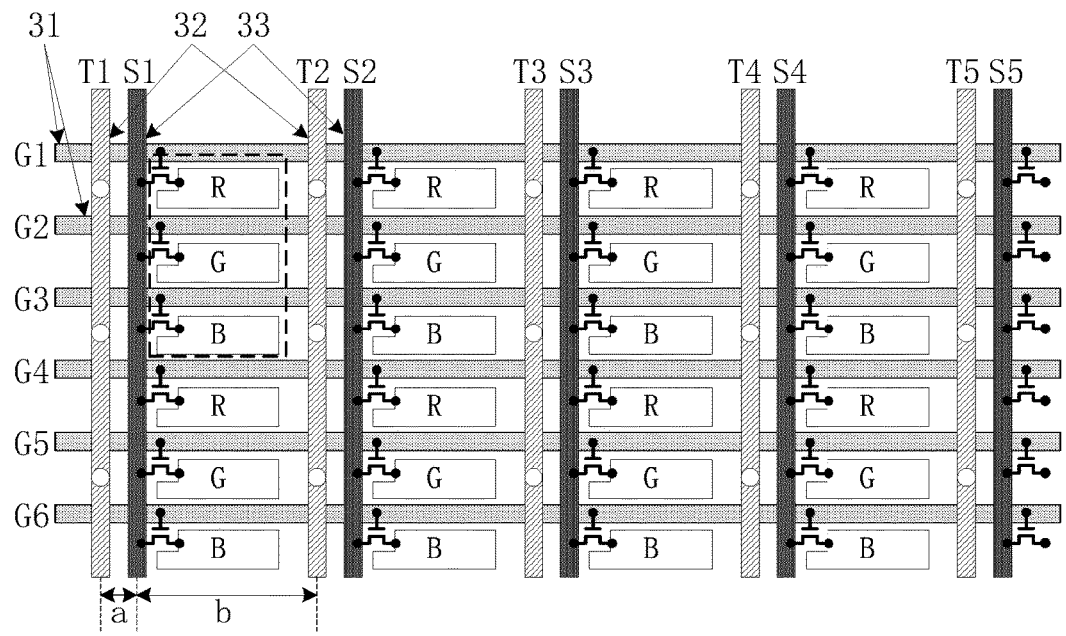
FIG. 3 is a schematic structural view of another embodiment of the touch control display panel according to the invention.

Referring to FIG. 3, FIG. 3 is a schematic structural view of another embodiment of the touch control display panel according to the invention. As shown in FIG. 3, the touch control display panel of the embodiment includes scan lines 31, touch wires 32 and data lines 33.

One side of each data line 33 is correspondingly disposed with one touch wire 32, a distance between each data line 33 and the touch wire 32 corresponding thereto is less than a distance between the data line 33 and the adjacent next touch wire 32 which is at the same side of the touch wire 32 as the data line 33. Specifically, as shown in FIG. 3, the data lines 33 include data lines S1, S2, S3, S4 and S5, the touch wires 32 include touch wires T1, T2, T3, T4 and T5, the left side of the data line S1 is disposed with the touch wire T1, and the right side of the data line S1 is disposed with pixel units. The distance a between the data line S1 and the touch wire T1 is less than the distance b between the data line S1 and the touch wire T2, i.e., a<b.

Figure 4:
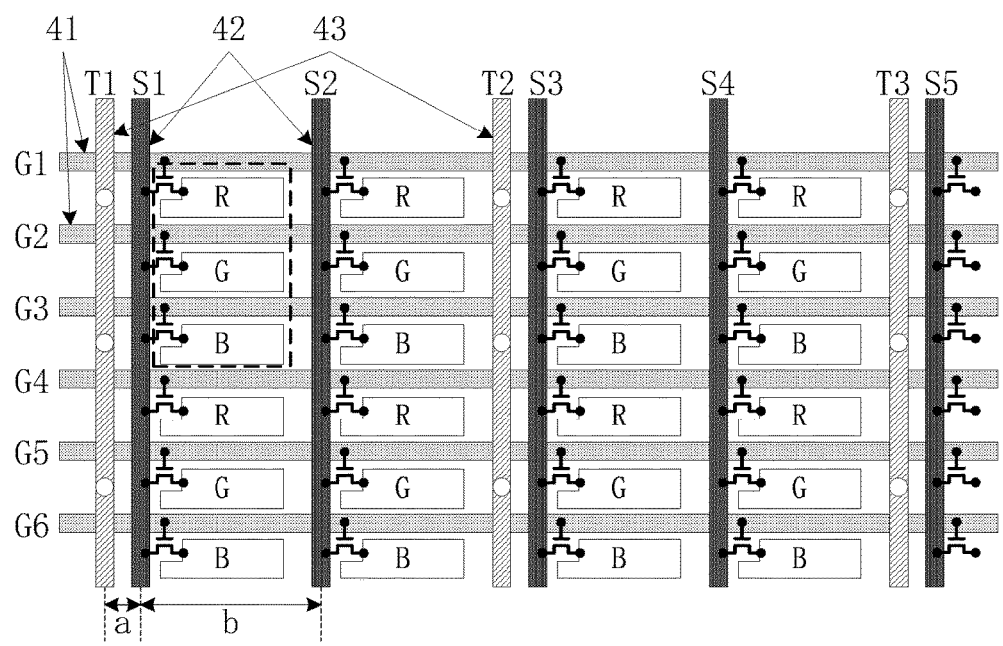
FIG. 4 is a schematic structural view of still another embodiment of the touch control display panel according to the invention.

Referring to FIG. 4, FIG. 4 is a schematic structural of still another embodiment of the touch control display panel according to the invention. As shown in FIG. 4, the touch control display panel of the embodiment includes scan lines 41, data lines 42 and touch wires 43. The data lines 42 include S1, S2, S3, S4 and S5; and the touch wires 43 include T1, T2 and T3.

One side of the data line 42 of each odd column of pixel units correspondingly is disposed with one touch wire 43, a distance between the data line 42 of the odd column of pixel units and the touch wire 43 corresponding thereto is less than a distance between the touch wire 43 and the adjacent next data line 42 which is at the same side of the touch wire 43 as the data line of the odd column of pixel units. Specifically, as shown in FIG. 4, the left side of the data line S1 is disposed with the touch wire T1, the right side of the data line S1 is disposed with the pixel units, the left side of the data line S2 is not disposed with touch wire, and the right side of the data line S2 is disposed with the pixel units. The distance a between the data line S1 and the touch wire T1 is less than the distance b between the data line S1 and the data line S2, i.e., a<b.

Figure 5:
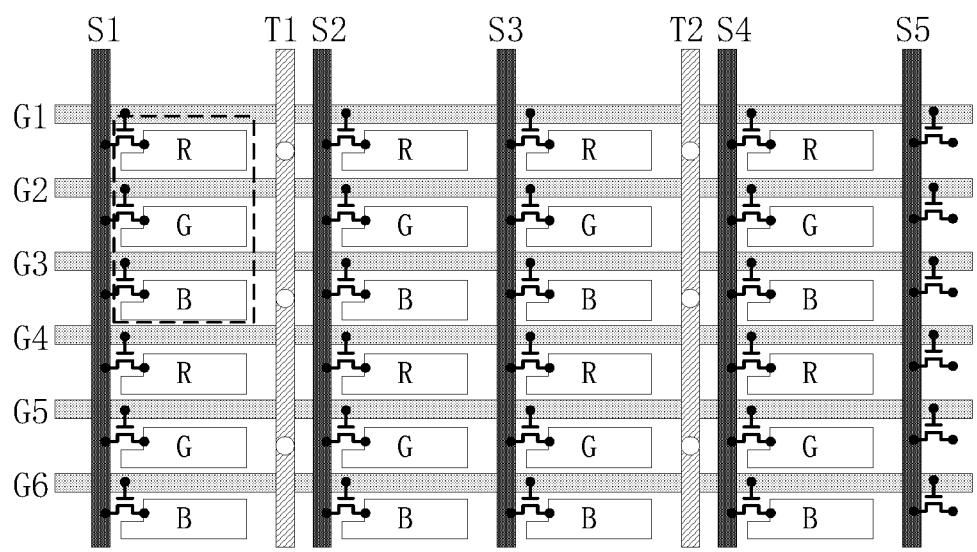
FIG. 5 is a schematic structural view of even still another embodiment of the touch control display panel according to the invention.

Alternatively, FIG. 5 is schematic structural view of even still another embodiment of the touch control display panel according to the invention. Each touch wire in FIG. 5 is disposed at one side of the data line of corresponding even column of pixel units.

The touch control display panel in the embodiment includes a plurality of pixel unit arranged in an array, a plurality of data lines, a plurality of touch wires and a plurality of scan lines; any one data line of the plurality of data lines is electrically connected to one column of pixel units, the plurality of touch wires and the data lines are disposed in the same layer, the data line of an odd column of pixel units and the data line of an adjacent even column of pixel units respectively are located at two sides of one touch wire; between each two adjacent touch wires, the distance between the data line of the odd column of pixel units and the data of the even column of pixel units is smaller than the distance between the data line of the odd/even column of pixel units and the adjacent touch wire, the number of rows of the plurality of scan lines is the same as the number of rows of the pixel units, as a result, manufacturing process is simplified, production efficiency is improved and thickness of the touch control display panel is reduced.

An embodiment of the invention also provides a display device including any one of the above embodiments of the touch control display panel.

The structure of the touch control display panel is the same as that of the above described embodiment, and thus will not be repeated herein. In addition, structures of other parts of the display device can refer to the prior art, and the present description will not describe the structures in detail. The display device may be a product or a part with any display function such as a smart phone, a tablet computer, a television, and so on.

The touch control display panel in the embodiment includes a plurality of pixel units arranged in an array, a plurality of data lines, a plurality of touch wires and a plurality of scan lines; any one data line of the plurality of data lines is electrically connected to one column of pixel units, the plurality of touch wires and the data lines are arranged in the same layer, the data line of an odd column of pixel units and the data line of an adjacent even column of pixel units are located at two sides of one touch wire respectively; between two adjacent touch wires, the distance between the data line of the odd column of pixel units and the data line of the even column of pixel units is smaller than the distance between the data line of the odd/even column of pixel units and the adjacent one of the two adjacent touch wires, the number of rows of the plurality of scan lines is the same as the number of rows of the pixel units, consequently manufacturing process is simplified, production efficiency is improved and thickness of the touch control display panel is reduced.

The foregoing is merely some embodiments of the invention and is not intended to limit the scope of the invention, any equivalent structure or equivalent process transformation made according to the specification and the accompanying drawings of the invention, or directly or indirectly used in other related technical fields, is similarly included in the scope of patent protection of the invention.

What is claimed is:

1. A touch control display panel, comprising: a plurality of pixel units arranged in an array;
a plurality of data lines, wherein any one of the data lines is electrically connected with one column of pixel units;
a plurality of touch wires, arranged in a same layer with the data lines, wherein the data line of an odd column of pixel units and the data line of an adjacent even column of pixel units respectively are located two sides of a corresponding touch wire; and between two adjacent touch wires, a distance between the data line of an odd column of pixel units and the data of an even column of pixel units is smaller than a distance from the data line of the odd/even column of pixel units and one of the two adjacent touch wires, and a distance from the data line of the odd column of pixel units to an adjacent one of the two adjacent touch wires is equal to a distance from the data line of the even column of pixel units to the other one of the two adjacent touch wires;
a plurality of scan lines, wherein the scan lines has a quantity of rows same as a quantity of rows of the pixel units;
pixel electrodes and common electrodes, wherein the common electrodes are also used as touch electrodes, the pixel electrodes are electrically connected with the pixel units, the touch electrodes are electrically connected with the touch wires, one touch electrode is corresponding to multiple pixel electrodes;
wherein the touch electrodes are electrically connected with the touch wires by a plurality of contact holes arranged to form a 2-D array the contact holes arranged in nth row and the pixel units arranged in $(2n-1)^{th}$ row are arranged in a same row, n is a natural number; and each contact hole is located between adjacent two pixel units.

2. The touch control display panel as claimed in claim 1, wherein colors of three pixel units successively arranged in a same column are different from each other, and the pixel units arranged in a same row have a same color.

3. The touch control display panel as claimed in claim 2, wherein the colors of the three pixel units successively arranged in the same column are red, green and blue.

4. The touch control display panel as claimed in claim 1, further comprising a thin film transistor (TFT), a light blocking layer, a glass substrate, a first buffer layer, and an insulating layer, wherein the glass substrate, the first buffer layer, and the insulating layer are stacked with each other in that order; the light blocking layer is located between the glass substrate and the first buffer layer; the TFT is located between the first buffer layer and the insulating layer so that the blocking layer is located between the glass substrate and the TFT.

5. A touch control display panel, comprising:
a plurality of pixel units arranged in an array;
a plurality of data lines, wherein any one of the data lines is electrically connected with one column of pixel units;
a plurality of the touch wires, arranged in a same layer with the data lines, wherein the data line of an odd column of pixel units and the data line of an adjacent even column of pixel units respectively are located at two sides of one touch wire; between two adjacent touch wires, a distance between the data line of an odd column of pixel units and the data line of an even column of pixel units is smaller than a distance from the data line of the odd/even column of pixel units to an adjacent one of the two adjacent touch wires;
a plurality of scan lines, wherein the scan lines have a quantity of rows same as a quantity of rows of the pixel units;
wherein the touch electrodes are electrically connected with the touch wires by a plurality of contact holes arranged to form a 2-D array the contact holes arranged in nth row and the pixel units arranged in $(2n-1)^{th}$ row are arranged in a same row, n is a natural number; and each contact hole is located between adjacent two pixel units.

6. The touch control display panel as claimed in claim 5, wherein the data line of an odd column of pixel units and the data line of an adjacent even column of pixel units respectively are located at two side of a corresponding touch wire, a distance from the data line of the odd column of pixel units to the corresponding touch wire is equal to a distance from the data line of the adjacent even column of pixel units to the corresponding touch wire.

7. The touch control display panel as claimed in claim 5, wherein the data line of an odd column of pixel units and the data line of an adjacent even column of pixel units respectively are located at two side of a corresponding touch wire, a distance from the data line of the odd column of pixel units to the corresponding touch wire is greater than a distance from the data line of the adjacent even column of pixel units to the corresponding touch wire.

8. The touch control display panel as claimed in claim 5, wherein one side of each of the data lines correspondingly is disposed with one touch wire, a distance between each of the data lines and the touch wire corresponding to the data line is less than a distance between the data line and an adjacent next touch wire which is at the same side of the touch wire as the data line.

9. The touch control display panel as claimed in claim 5, wherein one side of the data line of each odd/even column of pixel units correspondingly is disposed with one touch wire, a distance between the data line of the odd/even column of pixel units and the touch wire corresponding to the data line is smaller than a distance between the touch wire and an adjacent next data line which is at the same side of the touch wire as the data line of the odd/even column of pixel units.

10. The touch control display panel as claimed in claim 5, wherein the touch control display panel further comprises pixel electrodes and common electrodes, the common electrodes are also used as touch electrodes, the pixel electrodes are electrically connected with the pixel units, the touch electrodes are electrically connected with the touch wires, one touch electrode is corresponding to multiple pixel electrodes.

11. The touch control display panel as claimed in claim 5, wherein colors of three pixel units successively arranged in a same column are different from each other, and the pixel units arranged in a same row have a same color.

12. The touch control display panel as claimed in claim 11, wherein the colors of the three pixel units successively arranged in the same column are red, green and blue.

13. The touch control display panel as claimed in claim 5, further comprising a thin film transistor (TFT), a light blocking layer, a glass substrate, a first buffer layer, and an insulating layer, wherein the glass substrate, the first buffer layer, and the insulating layer are stacked with each other in that order; the light blocking layer is a between the glass substrate and the first buffer layer; the TFT is located between the first buffer layer and the insulating layer so that the blocking layer is located between the glass substrate and the TFT.

14. A display device comprising a touch control display panel, a color filter substrate, and a liquid crystal layer disposed between the touch control display panel and the color filter substrate, wherein the color filter substrate comprises an opaque region, the touch control display panel comprises a plurality of pixel units arranged in an array, a plurality of data lines, a plurality of touch wires and a plurality of scan lines;
  any one of the data lines is electrically connected to one column of pixel units; the touch wires and the data lines are arranged in a same layer, the data lines of an odd column of pixel units and the data line of an adjacent even column of pixel units respectively are located at two sides of one touch wire; between two adjacent touch wires, a distance between the data line of an odd column of pixel units and the data line of an even column of pixel units is less than a distance from the data line of the odd/even column of pixel units to one of the two adjacent touch wires;
  a quantity of rows of the scan line is the same as a quantity of rows of the pixel units^wherein the touch electrodes are electrically connected with the touch wires by a plurality of
  contact holes arranged to form a 2-D array the contact holes arranged in nth row and the pixel units arranged in $(2n-1)^{th}$ row are arranged in a same row, n is a natural number; and each contact hole is located between adjacent two pixel units.

15. The display device as claimed in claim 14, wherein, wherein the data line of an odd column of pixel units and the data line of an adjacent even column of pixel units respectively are located at two side of a corresponding touch wire, a distance from the data line of the odd column of pixel units to the corresponding touch wire is equal to a distance from the data line of the adjacent even column of pixel units to the corresponding touch wire.

16. The display device as claimed in claim 14, wherein the data line of an odd column of pixel units and the data line of an adjacent even column of pixel units respectively are located at two side of a corresponding touch wire, a distance from the data line of the odd column of pixel units to the corresponding touch wire is greater than a distance from the data line of the adjacent even column of pixel units to the corresponding touch wire.

17. The display device as claimed in claim 14, wherein one side of each of the data lines correspondingly is disposed with one touch wire, a distance between each of the data lines and the touch wire corresponding to the data line is less than a distance between the data line and an adjacent next touch wire which is at the same side of the touch wire as the data line.

18. The display device as claimed in claim 14, wherein one side of the data line of each odd/even column of pixel units correspondingly is disposed with one touch wire, a distance between the data line of the odd/even column of pixel units and the touch wire corresponding to the data line is smaller than a distance between the touch wire and an adjacent next data line which is at the same side of the touch wire as the data line of the odd/even column of pixel units.

19. The display device as claimed in claim 14, wherein the touch control display panel further comprises pixel electrodes and common electrodes, the common electrodes are also used as touch electrodes, the pixel electrodes are electrically connected with the pixel units, the touch electrodes are electrically connected with the touch wires, one touch electrode is corresponding to multiple pixel electrodes.

20. The display device as claimed in claim 14, wherein the touch control display panel further comprises a thin film transistor (TFT), a light blocking layer, a glass substrate, a first buffer layer, and an insulating layer; the glass substrate, the first buffer layer, and the insulating layer are stacked with each other in that order; the light blocking layer is located between the glass substrate and the first buffer layer; the TFT is located between the first buffer layer and the insulating layer so that the blocking layer is located between the glass substrate and the TFT.

* * * * *